United States Patent [19]

Straehle et al.

[11] Patent Number: 4,582,926

[45] Date of Patent: Apr. 15, 1986

[54] PROCESS FOR THE PREPARATION OF POLYESTER OR POLYETHER-POLYESTER POLYOL

[75] Inventors: Wolfgang Straehle, Heidelberg; Matthias Marx, Bad Durkheim, both of Fed. Rep. of Germany

[73] Assignee: BASF Aktiengesellschaft, Ludwigshafen, Fed. Rep. of Germany

[21] Appl. No.: 598,247

[22] Filed: Apr. 9, 1984

[30] Foreign Application Priority Data

Apr. 28, 1983 [DE] Fed. Rep. of Germany ....... 3315381

[51] Int. Cl.$^4$ .................. C07C 67/08; C07C 67/26
[52] U.S. Cl. ........................................ 560/91; 560/83; 560/89; 560/127; 560/192; 560/197; 560/198; 560/200; 560/93
[58] Field of Search ............... 560/83, 89, 91, 127, 560/192, 197, 198, 200, 93

[56] References Cited

U.S. PATENT DOCUMENTS

| | | | |
|---|---|---|---|
| 3,459,733 | 8/1969 | Byrd et al. | 560/198 X |
| 3,462,395 | 8/1969 | Wiener | 560/198 X |
| 3,585,185 | 6/1971 | Levis et al. | 560/198 X |
| 4,144,395 | 3/1979 | Murphy et al. | 560/200 |

*Primary Examiner*—Natalie Trousof
*Assistant Examiner*—Vera C. Clarke
*Attorney, Agent, or Firm*—Norbert M. Lisicki

[57] ABSTRACT

In order to prepare polyester or polyetherpolyester polyols, polyols, preferably di- to hexafunctional polyether polyols having hydroxyl numbers from 15 to 250 are esterified with at least one carboxylic acid anhydride, preferably phthalic acid anhydride, in the presence of N-methylimidazole, triethylenediamine, and/or triphenylphosphine as catalysts to form a carboxylic acid half-ester, and said half-ester is then oxyalkylated with at least one alkylene oxide, preferably ethylene oxide, in the presence of N-methylimidazole, triethylenediamine, triphenylphosphine, thiodialkylene glycol, employing a mixture of at least two of the compounds cited as catalysts.

8 Claims, No Drawings

PROCESS FOR THE PREPARATION OF POLYESTER OR POLYETHER-POLYESTER POLYOL

BACKGROUND OF THE INVENTION

1. Field of the Invention

The present invention relates to polyester or polyether-polyester polyols. More particularly, the invention relates to polyester or polyether-polyester polyols prepared employing N-methylimidazole, triethylenediamine and/or triphenylphosphine as catalysts for the esterification step and mixtures of at least two of the following catalysts N-methylimidazole, triethylenediamine, triphenylphosphine and thiodialkylene glycol for the oxyalkylation step.

2. Description of the Prior Art

In order to prepare flame-resistant polyurethane foams, halogen- and ester group-containing polyether polyols are often used as the basic components.

According to DE-A 19 23 936 (U.S. Pat. Nos. 3,585,185); 3,459,733; 3,639,541; and 3,639,542; such polyether-polyester polyols are obtained by the reaction of polyether polyols, which in some cases may contain phosphorus in the initiator molecules, with halogen-containing carboxylic acid anhydrides, in particular tetrabromo- or tetrachlorophthalic acid anhydride, to form carboxylic acid half-esters and then through the subsequent oxyalkylation of the free carboxyl groups of said carboxylic acid half-esters.

In order to prepare the carboxylic acid half-esters, trialkylamines are used as catalysts in accordance with U.S. Pat. No. 4,144,395. This improves the color of the polyether-polyester polyols and shortens the reaction time.

The oxyalkylation is generally performed in the presence of either bases, such as alkali hydroxides or alkali alcoholates, or acids as catalysts. The disadvantage of this method is that the low selectivity of the catalysts means that both the oxyalkylation of the carboxyl groups and the addition of alkylene oxides to the resulting or already present hydroxyl groups of the polyester or polyether polyols are accelerated. In order to completely assure that all the carboxyl groups are fully esterified, the oxyalkylation step must be performed with a large access of alkylene oxides and a long reaction time. One further disadvantage is that the catalysts must be separated from the reaction mixture after completion of the reaction, which requires long and costly purification operations.

In order to avoid subsequent purification, as taught in EP-A 00468, the oxyalkylation of chlorine-containing phthalic acid half-esters is preferably performed in the absence of catalysts. However, with the non-catalyzed oxyalkylation a large excess of alkylene oxide is necessary to esterify all the carboxyl groups. A further disadvantage is that the alkylene oxides which have not reacted, up to 15 weight percent of the amount employed, must be distilled off and disposed of, which adversely affects both the economics of the process as well as its environmental impact.

The preparation of polyesters through the reaction of carboxylic acid anhydrides with alkylene oxides in the absence of water and in the presence of glycols and catalysts is described in U.S. Pat. No. 3,374,208. The catalysts cited here are metal compounds whose cations consist of zinc, tin, manganese, lead, nickel, cobalt, or cadmium ion, and anions of oxygen, chlorine, acetate, butyrate, phosphate, nitrate, stearate, oleate, and naphthenate ions.

The esterification of carboxylic acids with alkylene oxides in the presence of catalysts such as sulfuric acid, sodium acetate, iron (III)-chloride, etc. is also known (Methoden der organischen Chemie, in Vol. VIII, Houben-Weyl, Stuttgart: Georg Thieme Verlag, 1952. pp. 531–533).

In order to prepare polyurethanes from organic polyisocyanates and compounds having reactive hydrogen atoms, polyester or polyether-polyester polyols having highly reactive hydroxyl groups are required for various applications. Such compounds can be prepared through the introduction of primary hydroxyl groups by oxyalkylating conventional polyether polyols. However, to do this a large excess of ethylene oxide is required, leading to hydrophilic polyoxyethylene segments, which provide the resulting polyurethanes with hydrophilic properties. This hydrophilic characteristic is a disadvantage for important polyether polyol applications, for example, in the preparation of foams.

In order to avoid this disadvantage, the carboxylic acid half-esters as taught by European patent Application 82,111,822.1 are oxyalkylated with 1 mole of alkylene oxide per equivalent of carboxyl group in the presence of thiodialkyleneglycol as a catalyst. Particularly good results are obtained with this process when glutaric acid anhydride is used to prepare the carboxylic acid half-ester. However, if the polyols are reacted with other carboxylic acid anhydrides, such as tetrahydro- or phthalic acid anhydride, and the carboxylic acid half-esters are subsequently oxyalkylated, polyester or polyetherpolyester polyols are produced which, in part, are difficult to process into polyurethanes in a reproducible manner. An investigation into this problem revealed that there is a close relationship between the problems which occur and the formation of the carboxylic acid half-esters, whereby the formation of the carboxylic acid half-esters is poorer, when the hydroxyl number of the polyol is lower, in other words as the molecular weight is higher. The objective of the invention at hand was then to eliminate such process defects and to develop a process for the preparation of polyester or polyether-polyester polyols through catalytic esterification in which the carboxylic acid half-ester formation would proceed as quantitatively as possible and by which the subsequent oxyalkylation would not be negatively affected, but instead would occur as selectively as possible at the carboxyl group of the half-ester.

DESCRIPTION OF THE PREFERRED EMBODIMENTS

This objective was unexpectedly met through a process for the preparation of polyester or polyether-polyester polyols through the catalytic esterification of (a) polyols with carboxylic acid anhydrides to form carboxylic acid half-esters and the subsequent (b) oxyalkylation of the carboxylic acid half-esters with alkylene oxides, wherein, the formation of the carboxylic acid half-ester formation (a) takes place in the presence of N-methylimidazole, triethylenediamine, triphenylphosphine, or mixtures of at least two of said compounds as catalysts.

The new process has the advantage that the N-methylimidazole, triethylenediamine, and/or triphenylphosphine used in the invention not only catalyze the formation of the carboxylic acid half-esters, but also accelerate the oxyalkylation. The effectiveness of the catalyst or catalyst system can be recognized by the lowest possible free carboxylic acid anhydride concentration subsequent to the formation of a carboxylic acid half-ester, and by a low acid number after oxyalkylation, wherein the hydroxyl number approaches the theoretically calculated value. A further advantage is that the catalysts do not need to be removed from the reaction mixture after the preparation of the carboxylic acid half-ester. Rather, the mixture of N-methylimidazole and/or triethylenediamine and triphenylphosphine and/or thiodialkylene glycol is particularly effective in catalyzing the oxyalkylation reaction (b).

Expensive purification processes to separate the catalysts from the polyester or polyether-polyester polyols are also not needed after the oxyalkylation step.

The process of the invention is shown in the following reaction equation:

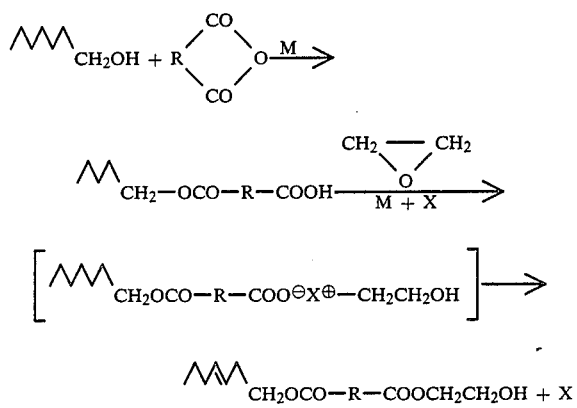

whereby, for example, M is N-methylimidazole and/or triethylenediamine and X is triphenylphosphine and/or thiodialkylene glycol.

In order to prepare the polyester or polyetherpolyester polyols in accordance with the process of the invention, carboxylic acid half-esters (a) are first prepared from polyols or polyol mixtures having from 2 to 6, preferably from 2 to 3, and more preferably 2, hydroxyl groups, and an organic carboxylic acid anhydride or carboxylic acid anhydride mixture in the presence of N-methylimidazole, triethylenediamine, triphenylphosphine, or a mixture of N-methylimidazole and/or triethylenediamine and triphenylphosphine, preferably N-methylimidazole or triethylenediamine as catalysts at temperatures from 50° C. to 240° C., preferably 90° C. to 200° C. and reaction times of 0.5 to 8 hours, preferably from 1 to 4 hours.

The basic polyol and carboxylic acid anhydride components are thus reacted in such amounts that 1 to 6 moles, preferably 1 mole, of carboxylic acid anhydride is present per mole polyol, and 1 to 6, preferably 2 equivalents hydroxyl groups are present per equivalent of anhydride group in the reaction mixture. The catalysts N-methylimidazole, triethylenediamine, and/or triphenylphosphine, are used in amounts from 0.05 to 2.0 parts by weight, preferably from 0.1 to 0.4 parts by weight per 100 parts of the reaction mixture, which consists of the polyol and the carboxylic acid anhydride.

The resulting carboxylic acid half-esters are then oxyalkylated (b) in the presence of 0.05 to 2.0 parts by weight, preferably 0.1 to 0.4 parts by weight, based on 100 parts by weight carboxylic acid half-ester, of N-methylimidazole, triethylenediamine, triphenylphosphine, thiodialkyleneglycol, or a mixture of at least two of said compounds as catalysts with from 1 to 1.5 moles of alkylene oxide, preferably 1 mole of alkylene oxide per equivalent carboxyl group. Preferably thiodialkylglycol and, triphenylphosphine, are used as oxyalkylation catalysts.

Particularly desirable results are obtained when the carboxylic acid half-ester formation (a) is performed in the presence of N-methylimidazole and/or triethylenediamine as catalysts and additional triphenylphosphine is added to the reaction mixture for the oxyalkylation (b) so that a catalyst mixture of N-methylimidazole and/or triethylenediamine and triphenylphosphine is active here. This embodiment is especially preferred. The oxyalkylation is generally performed at temperatures from 80° to 160° C., preferably from 90° to 130° C., at standard pressure, or, preferably, at elevated pressure, for example from 0.5 to 10 bar, advantageously in the presence of inert gases such as nitrogen, helium, neon, etc., or their mixtures.

After an acid number of less than 1 has been reached, the oxyalkylation is ended. If the reaction mixture still contains free monomeric alkylene oxide, the oxide is best distilled off at a reduced pressure.

The following should be noted regarding the basic components which may be used to prepare the polyester and/or polyether-polyester polyols:

The following polyols have proved successful for preparing the carboxylic acid half-esters (a): 2- to 6-functionality, preferably 2- and 3-functionality polyols having molecular weights from 62 to 350, preferably from 62 to 140, such as 1,2-ethylene glycol, 1,3- and 1,2-propylene glycol, 1,4-butylene glycol, diethylene glycol, dipropylene glycol, 1,3-pentanediol, 1,5-pentanediol, 1,6-hexanediol, 1,7-heptanediol, glycerine, 1,1,1-trimethylolpropane, 1,1,1-trimethylolethane, 1,2,6-hexanetriol, α-methylglucoside, pentaerythritol, and sorbitol. However, di- to hexafunctional, in particular di- and/or trifunctional polyether polyols having hydroxyl numbers from 15 to 250, and preferably from 30 to 110, are preferred. The polyether polyols can themselves be prepared by, for example, the polyaddition of alkylene oxides such as 1,2- or 2,3-butylene oxide, 1,3-propylene oxide, or preferably ethylene oxide and/or 1,2-propylene oxide with conventional initiator molecules, such as the polyols cited above, in the presence of acid or preferably basic catalysts or through the polymerization of tetrahydrofuran with known catalysts, for example borofluoride etherate, antimony pentachloride, or bleaching earth. The polyols can be employed individually or in the form of mixtures. Polypropylene ether glycols having molecular weights from 500 to 3000 are preferably used.

Aliphatic monoanhydrides, which may be halogen-substituted, cycloaliphatic di- and/or monoanhydrides, which may be substituted, and aromatic di- and/or, preferably, aromatic monoanhydrides, which may be substituted, are suitable as carboxylic acid anhydrides. Typical examples are: aliphatic carboxylic acid anhydrides such as maleic acid, dichloromaleic acid, succinic acid, and glutaric acid anhydride; cycloaliphatic carboxylic acid anhydrides such as hexahydro- and tetrahydrophthalic acid anhydride; and aromatic carboxylic acid anhydrides such as tetrachlorophthalic acid, tetrabromophthalic acid, trimellitic acid anhydride, and pyromellitic acid dianhydride and, preferably phthalic acid anhydride. As already described, thiodialkylene glycols may be used as catalysts for the oxyalkylation of the carboxyl groups of the carboxylic acid half-esters. Thiodialkylene glycol having from 2 to 6, preferably 2 to 3, carbon atoms in the alkylene radical has proven itself. Typical examples are thiodihexylene glycol, thiodibutylene glycol, and, preferably, thiodipropylene and/or thiodiethylene glycol.

Alkylene oxides or alkylene oxide mixtures, which may be substituted with alkoxy groups or halogen atoms, for example, ethylene oxide, 1,2-propylene oxide, butylene oxides, hexylene oxides, octylene oxides, dodecyleneoxides, methoxy- or ethoxy-1,2-propylene oxide, 3-chloro-1,2-propylene oxide, 3,3-dichloro-1,2-propylene oxide, and cyclohexene oxide are suitable for oxyalkylating the carboxyl groups of the carboxylic acid half-esters. Preferably used are: 1,2-propylene oxide, mixtures of 1,2-propylene oxide and ethylene oxide, and, more preferably, ethylene oxide.

The polyester or polyether-polyester polyols prepared in accordance with the invention have an acid number of less than 1 and a monomeric alkylene oxide content of less than 1 weight percent. Said polyester and polyether-polyester polyols are valuable auxiliaries and intermediaries. Said polyether-polyester polyols are particularly useful for the preparation of polyurethane plastics.

EXAMPLES 1-4 AND COMPARISON EXAMPLES 1-6

General Product Definition Specifications

In a reactor suitable for oxyalkylations, one mole of a trifunctional polyetherol having a hydroxyl number of 43 prepared from glycerine as an initiator molecule and a mixture of ethylene oxide and 1,2-propylene oxide in a nitrogen atmosphere was reacted with 3 moles of carboxylic acid anhydride in the presence of the indicated catalyst (a), at 180° C. and esterified at this temperature for 4 hours. After this time a sample was taken to determine the free carboxylic acid anhydride content.

The resulting polyether carboxylic acid half-ester mixture was then oxyalkylated at a temperature of 105° C. and an initial nitrogen pressure of 2 bar in the presence of catalysts (a) and (b) with 3 moles of alkylene oxide. After the alkylene oxide had reacted completely, the volatile components were distilled off the reaction mixture at a temperature of max. 120° C. and a pressure of 0.5 bar, and the acid and hydroxyl numbers of the resulting polyether-polyester polyols were determined.

The carboxylic acid anhydrides, catalysts (a) and (b) and alkylene oxides which were used, as well as the observed analytical data, are summarized in Tables 1 and 2.

EXAMPLE 5 AND 6

General Product Definition Specifications

In a reactor suitable for oxyalkylations, 1 mole of a trifunctional polyether polyol having a hydroxyl number of 56, prepared by reacting glycerine as an initiator molecule, with an ethylene oxide 1,2-propylene oxide mixture, and 2.7 moles carboxylic acid anhydride were heated to 180° C. in the presence of the catalyst (a) and were esterified for 4 hours at this temperature. After this time, a sample was taken to determine the free carboxylic acid anhydride content.

The resulting polyether carboxylic acid half-ester mixture was oxyalkylated in a method similar to that used in Examples 1–4.

The basic components and catalysts used (a) and (b) as well as the observed analytical data are summarized in Table 1.

TABLE 1

| | | | Examples 1–6 | | | | | |
| Example | Carboxylic Acid Anhydride | Catalyst (a) 0.2 wt. %* | Free Anhydride Content, wt. % | Alkylene Oxide | Catalyst (b) 0.2 wt. 5 | Acid No. | OH No. observed | OH No. calculated |
| --- | --- | --- | --- | --- | --- | --- | --- | --- |
| 1 | Phthalic acid anhydride | N—Methyl-imidazole | 1.3 | Ethylene oxide | — | 0.7 | 41 | 36 |
| 2 | Phthalic acid anhydride | N—Methyl-imidazole | 1.3 | Ethylene oxide | Thio-di-ethylene glycol | 0.2 | 41 | 36 |
| 3 | Phthalic acid anhydride | N—Methyl-imidazole | 1.1 | Ethylene oxide | Triphenyl-phosphine | 0.6 | 38 | 36 |
| 4 | Tetrahydro-phthalic acid anyhydride | N—Methyl-imidazole | 0.4 | Ethylene oxide | Thiodi-ethylene glycol | 0.4 | 42 | 37 |
| 5 | Phthalic acid anhydride | N—Methyl-imidazole | 1.1 | Ethylene oxide | Triphenyl-phosphine | 0.4 | 47 | 47 |
| 6 | Phthalic acid anhydride | Triethylene diamine | 0.8 | Ethylene oxide | Triphenyl-phosphine | 0.4 | 49 | 47 |

*based on the weight of the mixture of polyol and carboxylic acid anhydride

TABLE 2

| | | | Comparison Examples 1–6 | | | | | |
| Example | Carboxylic Acid Anhydride | Catalyst (a) 0.2 wt. %* | Free Anhydride Content, wt. % | Alkylene Oxide | Catalyst (b) 0.2 wt. 5 | Acid No. | OH No. observed | OH No. calculated |
| --- | --- | --- | --- | --- | --- | --- | --- | --- |
| 1 | Phthalic Acid anhydride | Acetylace-tonate | 2.9 | Ethylene oxide | Thio-di-ethylene glycol | 3 | 43 | 36 |
| 2 | Phthalic Acid anhydride | Magnesium acetylace-tonate | 3.2 | Ethylene oxide | — | 24 | 17 | 36 |
| 3 | Phthalic Acid | Magnesium | 3.2 | Ethylene | Thio-di- | 8.0 | 44 | 36 |

TABLE 2-continued

| | | Comparison Examples 1-6 | | | | | |
|---|---|---|---|---|---|---|---|
| Example | Carboxylic Acid Anhydride | Catalyst (a) 0.2 wt. %* | Free Anhydride Content, wt. % | Alkylene Oxide | Catalyst (b) 0.2 wt. 5 | Acid No. | OH No. observed | OH No. calculated |
| | anhydride | acetylacetonate | | oxide | ethylene glycol | | | |
| 4 | Phthalic Acid anhydride | Calcium-naphthenate | 2.6 | Ethylene oxide | Thio-di-ethylene glycol | 6.0 | 35 | 36 |
| 5 | Phthalic Acid anhydride | Zincnapthenate | 2.3 | Ethylene oxide | Thio-di-ethylene glycol | 13 | 31 | 36 |
| 6 | Phthalic Acid anhydride | Tin-(II) octoate | 1.8 | Ethylene oxide | Thio-di-ethylene glycol | 2.0 | 43 | 36 |

*based on the weight of the mixture of polyol and carboxylic acid anhydride

The embodiments of the invention in which an exclusive privilege or property is claimed are defined as follows:

1. A process for the preparation of a polyester or polyether-polyester polyol by reacting:
    (a) a polyol with carboxylic acid anhydride to form carboxylic acid half-ester, and
    (b) oxyalkylating the carboxylic acid half-ester with alkylene oxide
wherein step (a) takes place in the presence of from 0.05 part to 2.0 parts by weight per 100 parts of the reaction mixture of a catalyst selected from the group consisting of N-methylimidazole, triethylenediamine, triphenylphosphine, and mixtures thereof at temperatures from 50° C. to 240° C., and wherein 1 mole of said polyol is reacted with 1 to 6 moles of said anhydride with 1 to 6 equivalents of hydroxyl groups present per equivalent of anhydride group.

2. The process of claim 1, wherein the catalyst is N-methylimidazole and/or triethylenediamine.

3. The process of claim 1, wherein the oxyalkylation step (b) takes place in the presence of a catalyst selected from the group consisting of at least two of the following N-methylimidazole, triethylenediamine, triphenylphosphine, and thio-dialkylene glycol.

4. The process of claim 1, wherein the catalyst in step (a) is selected from the group consisting of N-methylimidazole, triethylenediamine and mixtures thereof and the catalyst of step (b) is selected from the group consisting of a mixture of N-methylimidazole and triethylenediamine and a mixture of N-methylimidazole and triphenylphosphine.

5. The process of claim 1, wherein di- to hexafunctional polyether polyols having hydroxyl numbers from 15 to 250 are used as the polyols.

6. The process of claim 1, where phthalic acid anhydride is used as the carboxylic acid anhydride.

7. The process of claim 1, wherein ethylene oxide is used as the alkylene oxide.

8. The process of claim 1, wherein one mole of alkylene oxide is used per carboxyl group to oxyalkylate the carboxylic acid half-ester.

* * * * *